Patented June 13, 1950

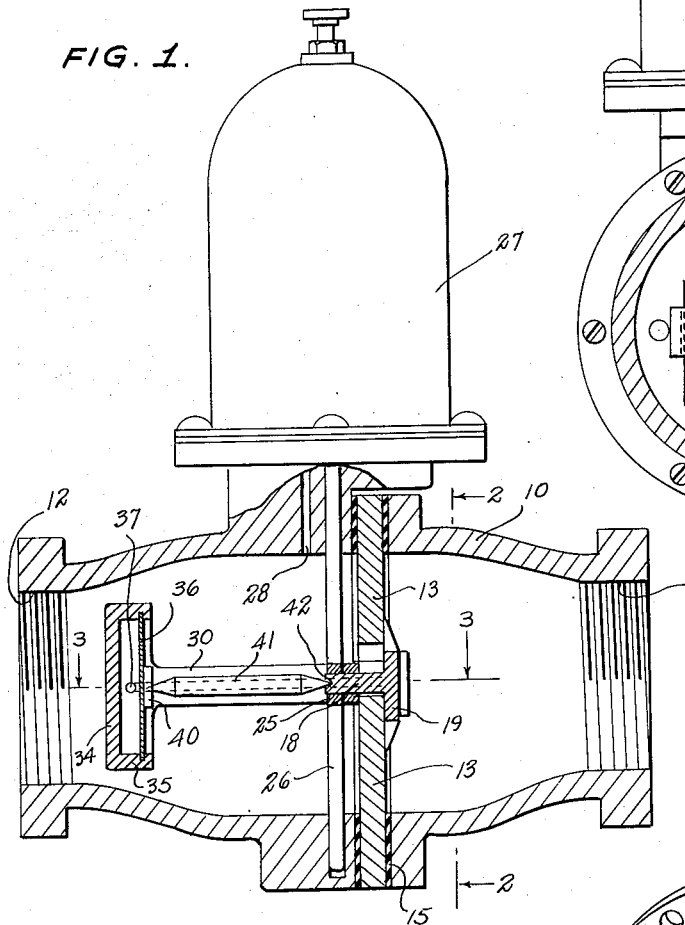
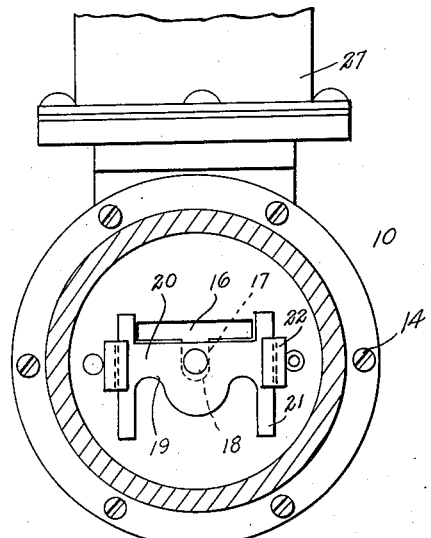
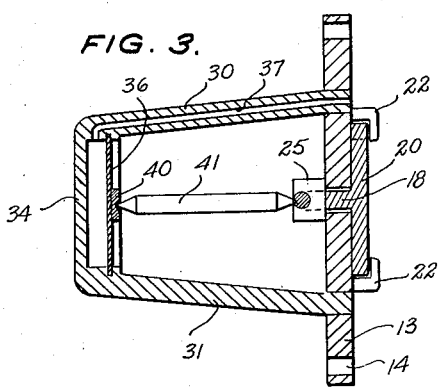
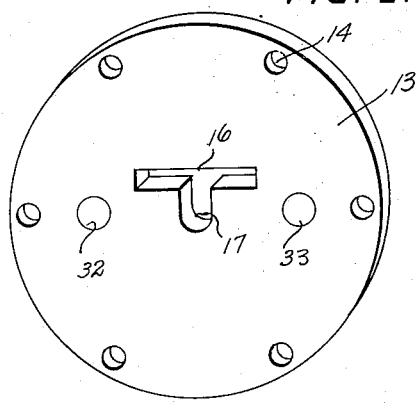

2,511,342

UNITED STATES PATENT OFFICE 2,511,342

FLUID-REGULATING VALVE

William Virgil Jordan, Waverly Hills, Ky.

Application May 20, 1947, Serial No. 749,195

5 Claims. (Cl. 50—20)

1

This invention relates to a fluid-regulating valve, and more particularly to a valve of the type provided with a device which is automatically responsive to pressure changes in the fluid to vary communication between one side of the valve and the other.

A primary object of this invention is the provision of an improved pressure-regulating device of this nature characterized by a linearly slidable valve member regulating the admission of fluid from the high side of the valve to the low, and having means for reducing the friction on the slidable valve member normally occasioned by the pressure on the high side of the line.

An additional object of the invention is the provision of a valve of this character provided with means whereby pressure on the high side of the line is by-passed to a pressure chamber on the low side of the line, and acts on the valve from the low side of the line to substantially equalize pressure on both sides thereof, or to substantially reduce the pressure differential in such manner that linear sliding movement of the valve may be readily effected.

A further and more specific object of the invention resides in the provision of pressure-equalizing means for a valve of this character comprising an improvement on my Patent No. 2,051,484, entitled "Fluid-regulating valve," issued August 18, 1936.

Still other objects of the invention reside in the combinations of elements, arrangements of parts, and features of construction, all as will be more fully pointed out hereinafter and disclosed in the accompanying drawings, wherein there is shown a preferred embodiment of this inventive concept.

In the drawings:

Figure 1 is a side view, partially in elevation, and partially in section, disclosing one form of pressure-reducing valve embodying features of my present invention.

Figure 2 is a sectional view taken substantially along the line 2—2 of Figure 1, as viewed in the direction indicated by the arrows.

Figure 3 is a sectional view taken substantially along the line 3—3 of Figure 1, as viewed in the direction indicated by the arrows.

Figure 4 is a perspective view of the plate dividing the high and low pressure sides of the valve.

Similar reference characters refer to similar parts throughout the several views of the drawings.

2

Referring now to the drawings in detail, the device of the instant invention includes a valve body 10, including a high pressure inlet 11 and a low pressure outlet 12 and a central partition 13 dividing the valve into high and low-pressure chambers. The partition 13 is provided, as best shown in Figure 4, with a plurality of radial apertures 14 adapted for the reception of bolts securing the partition in position, suitable sealing gaskets 15 being provided on opposite sides thereof, it being noted that the valve body is constructed in two parts to permit the ready assembly therewith with the partition.

The partition is provided with a centrally-disposed, T-shaped aperture 16, the cross member of which forms an inlet for fluid from the high-pressure side of the line to the low side, while the stem portion 17 permits passage through the partition 13 of the stem 18 secured to the rear face of the slide valve 19. The valve 19 includes a transverse aperture-closing portion 20, adapted to cover selected portions of the aperture 16 in a manner to be more fully described hereinafter, and provided with side legs 21 of substantial length, slidable in brackets 22 forming channels therefor and secured to the high-pressure side of the partition 13. By virtue of the length of the legs 21, tilting of the valve toward and away from the partition 13 is substantially precluded.

The valve stem 18 on the low-pressure side of the partition 13 is surrounded by a sleeve 25, formed integrally with a linearly movable rod 26, the upper extremity of which extends through a suitable bore in the top of the casing 10 into a chamber 27 containing a pressure-responsive valve of conventional type, such as is shown in my above-mentioned Patent No. 2,051,484, and responsive by means of a passage 28 to changes in pressure on the low side of the partition 13.

It will now be seen that the valve 20 is movable linearly to open or close an area of the aperture 16 corresponding to the amount of fluid it is desired to pass through the partition, in accordance with the pressure differential existing between the high and low sides of the system.

It will further be seen that, in the absence of such means as are contemplated by the instant invention, the pressure on the high side of valve 20 would be effective to bias the valve member toward the partition 13, thus introducing a relatively high coefficient of friction and a resultant drag on the valve which would cause a relatively great pressure change between the high and low sides of the partition to move the valve. It will be readily apparent that by reduction of this friction, the valve will become more sensitive, and correspondingly act on a lesser degree of pressure change. The instant invention contemplates such means, which takes the form of two rearwardly-extending supporting members 30 and 31, secured in apertures 32 and 33, respectively, in partition 13, terminating in an end plate 34 of circular configuration, and flanged, as indicated at 35, to form a chamber, one face of which adjacent partition 13 is closed by a diaphragm 36. The support 30 is provided with a bore 37 in communication with the high side of partition 13, and opening into the pressure chamber closed by the diaphragm 36.

The diaphragm 36 carries on its outer face a boss 40, within which is seated one end of a needle-tip pin 41, the opposite end of which seats in a depression 42 in the inner end of stem 18.

It will now be seen that pressure from the high side of the line admitted through the passage 37 to the pressure chamber acts on the diaphragm 36 to bias, through pin 41, valve stem 18 and hence valve 19 toward the high-pressure side of the line, thus materially reducing the pressure differential acting on opposite sides of the valve, and thus permitting relatively friction-free, linear movement of the valve in accordance with the movement of the rod 26.

From the foregoing it will now been seen that there is herein provided a construction which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a pressure-reducing valve including a body, a partition dividing said body into high and low-pressure chambers and having an aperture therein, a valve on the high-pressure side of said partition slidably movable to vary the dimensions of said aperture, means for moving said valve, and means for exerting pressure on the portion of said valve on the low-pressure side of said partition in excess of the normal low-side pressure proportionate to the high-side pressure, said means including a pressure chamber, a fluid pressure responsive diaphragm therefor, a connection between said diaphragm and the low pressure side of said valve, and a communication between said pressure chamber and the high-pressure side of said partition, said connection including a needle-pointed pin.

2. In a pressure-reducing valve including a body, a partition dividing said body into high and low-pressure chambers and having an aperture therein, a valve on the high-pressure side of said partition slidably movable to vary the dimensions of said aperture, means for moving said valve, and means for exerting pressure on said valve from the low-pressure side of said partition in excess of the normal low-side pressure proportionate to the high-side pressure, said means including a pressure chamber, a fluid pressure responsive diaphragm therefor, a connection between said diaphragm and the low pressure side of said valve, and a communication between said pressure chamber and the high-pressure side of said partition, said connection including a needle-pointed pin, said valve having a stem extending through said partition aperture with a depression in the end thereof to accommodate one end of said pin.

3. In a pressure-reducing valve including a body, a partition dividing said body into high and low-pressure chambers and having an aperture therein, a valve on the high-pressure side of said partition slidably movable to vary the dimensions of said aperture, means for moving said valve, and means for exerting pressure on said valve from the low-pressure side of said partition in excess of the normal low-side pressure proportionate to the high-side pressure, said means including a pressure chamber, a fluid pressure responsive diaphragm therefor, a connection between said diaphragm and the low pressure side of said valve, and a communication between said pressure chamber and the high-pressure side of said partition, said connection including a needle-pointed pin, said valve having a stem extending through said partition aperture with a depression in the end thereof to accommodate one end of said pin, the other end of said pin being seated in a depression in a boss carried by said diaphragm.

4. A valve device, comprising casing sections having adjacent ends, a partition arranged between the adjacent ends for providing high and low pressure chambers within the casing sections and having an opening therein, a substantially flat plate movably mounted upon the high pressure side of the partition to cover and uncover the opening, a stem carried by the valve plate extending through the opening to the low pressure side of the partition, a diaphragm casing within the casing section upon the low pressure side of the partition, a support mounting the diaphragm casing upon the partition and including a tube having a bore which leads into the diaphragm casing and the high pressure chamber, a diaphragm mounted upon the diaphragm casing, and a rod to transmit pressure from the diphragm to the stem and pivotally connected with the diaphragm and stem, and means to move the valve plate.

5. A valve device, comprising a casing, a partition arranged within the casing for providing high and low pressure chambers and having an opening therein, a rectilinear reciprocatory valve plate movably mounted upon the high pressure side of the partition to cover and uncover the opening, a stem carried by the valve plate extending through the opening to the low pressure side of the partition, a diaphragm casing mounted within the casing upon the low pressure side of the partition, a tube having a bore leading into the diaphragm casing and into the high pressure chamber, a diaphragm mounted upon the diaphragm casing, and a rod to transmit pressure from the diaphragm to the stem and pivotally connected with the diaphragm and the stem, and means to move the valve plate.

WILLIAM VIRGIL JORDAN.

REFERENCES CITED

The following references are of record in the file of this patent:

UNITED STATES PATENTS

| Number | Name | Date |
| --- | --- | --- |
| 190,442 | McLaughlin | May 8, 1877 |
| 2,051,484 | Jordan | Aug. 18, 1936 |
| 2,079,774 | Shipley | May 11, 1937 |